United States Patent [19]

Doebler et al.

[11] Patent Number: 5,385,656
[45] Date of Patent: Jan. 31, 1995

[54] PROCESS FOR PRODUCING GRAVEL-IMPACT-RESISTANT MULTICOAT LACQUER FINISHES AND PASTE FILLER USABLE THEREFOR

[75] Inventors: Klaus P. Doebler, Radevormwald; Wolfgang Göldner, Heiligenhaus; Roland Grütter, Wuppertal; Reiner Jungermann, Dortmund; Manfred Oppermann, Wuppertal, all of Germany

[73] Assignee: Herberts GmbH, Wuppertal, Germany

[21] Appl. No.: 918,482

[22] Filed: Jul. 22, 1992

[30] Foreign Application Priority Data

Aug. 1, 1991 [DE] Germany ............................ 4125459

[51] Int. Cl.⁶ ............................................. C25D 12/12
[52] U.S. Cl. ............................... 204/181.1; 204/181.4; 204/181.7; 427/409
[58] Field of Search ............... 204/181.1, 181.4, 181.7; 427/409

[56] References Cited

U.S. PATENT DOCUMENTS

| | | | |
|---|---|---|---|
| 3,998,716 | 12/1976 | Masar et al. | 204/181.1 |
| 4,139,672 | 2/1979 | Ozawa et al. | 204/181.1 |
| 4,456,507 | 6/1984 | Kivel et al. | 427/409 |
| 4,820,555 | 4/1989 | Kuwajima et al. | 427/409 |
| 4,933,214 | 6/1990 | Sugiura et al. | 427/409 |

FOREIGN PATENT DOCUMENTS

| | | | |
|---|---|---|---|
| 51433 | 4/1977 | Japan | 204/181.1 |
| 61962 | 5/1980 | Japan . | |
| 48367 | 3/1982 | Japan . | |

*Primary Examiner*—Kathryn Gorgos
*Assistant Examiner*—Kishor Mayeker
*Attorney, Agent, or Firm*—Richard A. Speer

[57] ABSTRACT

A process for producing a gravel-impact-resistant multicoat lacquer finish by cathodic electrodeposition of a primer on an electrically conductive substrate, subsequent application of a primer surfacer coat of an aqueous paste filler that contains one or several water-dilutable binders that are curable at temperatures up to 180° C., with subsequent application of one or several base coats and finishing coats. To produce the primer surfacer coat, an aqueous paste filler is used that contains 0.1–20 wt % polyamide powder, polyacrylonitrile powder or mixtures thereof with particle diameters in the range 0.1–100 μm, wherein the high-solid value of the aqueous paste filler is not less than 75 wt %.

18 Claims, No Drawings

PROCESS FOR PRODUCING GRAVEL-IMPACT-RESISTANT MULTICOAT LACQUER FINISHES AND PASTE FILLER USABLE THEREFOR

FIELD OF THE INVENTION

The invention relates to aqueous paste fillers containing one or several water-dilutable binders for producing multicoat lacquer finishes. Such paste fillers are suitable for producing gravel-impact-resistant multicoat lacquer finishes, especially in the motor vehicle sector. The invention therefore also relates to a process for producing gravel-impact-resistant multicoat lacquer finishes as well as the use of the aqueous paste fillers for this.

BACKGROUND OF THE INVENTION

A primer surfacer means a coating agent that is applied in multicoat coatings or multicoat lacquer finishes, e.g. on a primer or a gravel-impact intermediate primer, especially in the motor vehicle sector, and because of its film build evensout the unevennesses of the underlying coat and of the substrate, e.g. of a sheet metal, in order that a smoother surface is produced before the application of the subsequent coats.

Film build accordingly means the capacity of a surface coating to even-out the unevennesses of the substrate, whereby the optical effect of an especially well lacquered surface (build) is produced in the subsequent finishing coat.

The primer surfacer generally contains a higher pigment or extender volume ratio than the subsequent coats. The primer surfacer is achromatic or coloured. It need not match the colour of a subsequent coat.

In the course of time, the primer surfacer will in future have to be as free as possible from organic solvents for ecological reasons. Two approaches to this end are possible: the solvent-based high-solid systems with high solids content and the water-dilutable systems with extremely low content of organic solvents. With the water-dilutable systems, in contrast to the high-solid systems, more interesting primer surfacers with a lower proportion of organic solvents are obtained.

For various reasons, the water-dilutable primer surfacers usable for the automobile industry generally still contain organic solvents. The proportion of these solvents and volatile neutralizing agents must be as small as possible, and as far as possible not more than 25 wt %, preferably not more than 20 wt %, relative to the sum of the percentages by weight of lacquer solids, organic solvents and volatile neutralizing agents; or, in other words, the high-solid value must not be less than 75 wt %, preferably not less than 80 wt %.

The calculation is made according to the formula $$\text{High-solid value (wt \%)} = \frac{FK \times 100}{FK + LM + Nm}$$

FK = g solids (30 minutes at 105° C.)
LM = g organic solvents
NM = g volatile neutralizing agents.

There must be no reduction in quality of the lacquering as a result of the replacement of solvent-dilutable primer surfacers by water-dilutable primer surfacers. Up to now, however, a complete adaptation of the properties of water-dilutable primer surfacers with low content of organic solvents has not been achieved to a sufficient degree. Thus in particular the gravel-impact resistance and the corrosion protection are among the properties of water-dilutable primer surfacers that cannot always be obtained reproducibly from batch to batch.

From DE-PS-38 05 629, water-dilutable, gravel-impact-resistant coating agents from combinations of polyesters or acrylate resins with blocked isocyanates are known. An aqueous primer surfacer is applied to these coating agents, so that an additional operation is necessary for the application of the whole lacquer finish.

In the International Patent Application with publication number WO 88/03159, water-dilutable coating agent compositions and aqueous primer surfacers are described that must contain polyesters modified with bisphenol A epoxy resins. The disadvantage of these systems lies in the limited choice of binders. Every expert knows how multifarious and different the requirements for primer surfacers for different applications can be. For this reason, it is necessary not to be restricted to one binder system.

SUMMARY OF THE INVENTION

The problem therefore existed of providing aqueous primer surfacers whose content of organic solvents is small and that, irrespective of the selection of specific binders, are equal or even superior to the solvent-dilutable primer surfacers, even in gravel-impact resistance and in corrosion protection. It should be possible to use such primer surfacers in particular for automobile lacquering.

It has proved possible to solve this problem if powders of polyamide, polyacrylonitrile or mixtures thereof are added as additives to aqueous coating agents which are intended for use as primer surfacers, or are co-utilized in the production of water-dilutable primer surfacers. As a result of this, the gravel-impact resistance and corrosion resistance of the low-solvent or solvent-free water-dilutable primer surfacers are improved.

The invention therefore relates to a process for producing a gravel-impact-resistant multicoat lacquer finish on electrically conductive substrates by application of a primer by cathodic electrodeposition from an aqueous coating agent and subsequent application, wet-on-wet, after flashing off, drying or stoving, of a primer surfacer coat of an aqueous paste filler containing one or several water-dilutable binders, curable at temperatures up to 180° C., and application, wet-on-wet, after the drying or stoving, of one or several base coats and finishing coats, that is characterized in that an aqueous paste filler is used that contains 0.1 to 20 wt %, preferably 0.5-20 wt %, of polyamide powder, polyacrylonitrile powder or mixtures thereof with any particle diameters in the range 0.1 to 100 μm and that the high-solid value of the aqueous paste filler is not less than 75 wt %.

The invention also relates to aqueous paste fillers for producing gravel-impact-resistant multicoat lacquer finishes that contain one or several water-dilutable binders, curable at temperatures up to 180° C. These paste fillers are characterized in that they contain 0.1 to 20 wt % polyamide powder or mixtures of polyamide powder and polyacrylonitrile powder with any particle diameters in the range 0.1 to 100 μm and that the high-solid value is not less than 75 wt %.

The use of polymer powders in coating materials is described in EP-B1-0 083 139. There polyamide powder is added to coating compositions based on organic solvents and intended for use in the coil-coating process. In EP-OS 0 015 035, water-dilutable coating agent compositions based on the known maleate oils are described. The coating agent composition contains epoxy-group-containing compounds in the form of solid particles, e.g. epoxy resin, powders. With this system the corrosion protection and gravel-impact resistance of the solvent-dilutable primer surfacers are not achieved.

The water-dilutable primer surfacers to be used according to the invention are largely independent of the binder used. Any binder or binder system can be included that exhibits an almost continuous reduction of viscosity on dilution with water in the processing range and has no viscosity anomaly. With the viscosity anomaly, on adding water there is at first a viscosity increase ("water hill"), that then suddenly falls away. Binders or binder systems without viscosity anomaly are e.g. hybrid systems or polyelectrolyte-nonelectrolyte condensates, as described for example in AT-PS 328 587.

A preferred example of such a binder based on a hybrid system, as described in AT-PS 32 85 87, is a binder that contains 60 to 90 wt % of a mixture or partial condensation product of a water-soluble film-forming polyhydroxy compound with an acid number of less than 10 mg KOH/g and a hydroxyl number of 50–650 mg KOH/g and a film-forming polycarboxy compound with an acid number of 30–280 mg KOH/g in a molar ratio of carboxyl groups to hydroxyl groups of 1:2 to 1:25 with partially or completely neutralized carboxyl groups and 10–40 wt % of a polyvalent film-forming synthetic resin without polyelectrolyte character that can be reacted with hydroxyl groups, the percentages by weight relating in each case to the solids content of the binder.

Suitable film-forming polyhydroxy compounds can be produced in known manner, for example by condensation of polyols in excess, such as monoethylene glycol, diethylene glycol, triethylene glycol, glycerol, trimethylolpropane or pentaerythritol, with polycarboxylic acids or their anhydrides, such as phthalic acid, terephthalic acid, trimellitic acid, succinic acid, adipic acid and sebacic acid, optionally with partial co-utilization of monocarboxylic acids with 5 to 20 carbon atoms. Another possible synthesis consists in the reaction of excess polyol with diisocyanates, e.g. tolylene diisocyanate or hexamethylene diisocyanate. Likewise suitable polyhydroxy compounds are obtained by copolymerization of $\alpha,\beta$-ethylenically unsaturated compounds having free hydroxyl groups, such as ethylene glycol monomethacrylic acid ester, with other copolymerizable vinyl compounds, such as esters of acrylic or methacrylic acids with monohydric alcohols, amides of acrylic acid or methacrylic acid, styrene, vinyltoluene and other monomers, provided they have no carboxyl groups. The copolymers can also contain small amounts of condensed-in formaldehyde condensates of melamine, urea, benzoguanamine, phenols etc.

Suitable polycarboxy compounds with acid numbers of 30 to 280 mg KOH/g can be prepared for example by reaction of hydroxylrich precondensates with di- or tricarboxylic acid anhydrides, e.g. from hydroxyl-rich polyesters or polyurethanes with phthalic anhydride or trimellitic anhydride. The products of addition of dienophilic compounds, e.g. maleic anhydride, to unsaturated compounds with molecular weights exceeding 500 are preferred. These include the esters of natural unsaturated fatty acids and resin acids with polyalcohols, e.g. glycerol or pentaerythritol, or with compounds having epoxy groups, such as bisphenol A glycidyl ethers. Another suitable group of compounds, unsaturated and likewise capable of addition, are polymers of dienes (butadiene, isoprene). In all such addition products, the anhydride group is cleaved, either with water or with monohydric alcohols, before the use according to the invention as a polycarboxy compound. Furthermore, the copolymers of acrylic acid or methacrylic acid with other $\alpha,\beta$-ethylenically unsaturated monomers, such as (meth)acrylic acid esters, styrene or vinyltoluene, or also self-crosslinking copolymers as described in Austrian Printed Patent Specifications no. 291,571 and 299,543, can also be used as polycarboxy compounds.

The carboxyl groups of the polycarboxy compound are partially or completely neutralized. Suitable for this purpose are inorganic bases or volatile neutralizing agents, such as organic gases, for example nitrogen bases, such as ammonia, aliphatic amines or aliphatic alkanolamines. Examples of these are diethylamine, triethylamine, N,N'-dimethylethanolamine and diethanolamine.

The combination of polyhydroxy compounds and polycarboxy compounds can occur as a result of simple mixing. Optionally a partial condensation of the two components, for example at temperatures of 80° to 140° C., can also be carried out. As a result of this, the homogeneity of the combination product can be increased. The partial condensation is carried out to such a degree that the solubility in water is not lost; in most cases, the acid number in the condensation product is reduced by 8 to 15 units compared with the starting mixture.

Such polyvalent film-forming synthetic resins reactable with the hydroxyl groups are co-utilized as are those without polyelectrolyte character. These are for example condensation products of formaldehyde with urea, melamine, benzoguanamine, phenol, cresol, xylenol, and p-tert-butylphenol, optionally etherified with monohydric alcohols.

When water is added, the above combination products form a dispersion or emulsion in which the water-insoluble polyhydroxy component is stabilized by the water-soluble polycarboxy component.

An advantage of the use according to the invention of polymer powders is the possibility of stoving the applied water-dilutable primer surfacer of low solvent content at temperatures that are usual for general industrial lacquering and particularly for the lacquering of car bodies in order to obtain outstanding gravel-impact resistance, even at low temperatures down to $-30°$ C., very good corrosion protection, excellent adhesion and intercoat adhesion, in addition to which the increased spreading rate of the coating agent composition, the saving of colouring pigments and the easier waste disposal of defective batches by incineration with little residue can be mentioned.

DETAILED DESCRIPTION OF THE PREFERRED EMBODIMENT

The particle diameter of the powders used is in the range of 0.1 to 100 $\mu$m. It depends on the desired coating thickness and is chosen to be sufficiently small that in the applied and stoved primer surfacer and on the lacquer film applied to the latter a homogeneous and smooth surface is achieved. A rough, uneven surface certainly often gives a good adhesion of the subsequent coats, but is often undesirable owing to the optical defects. Particle sizes up to 100 $\mu$m are suitable in particular for high-build primer surfacers or alternatively for materials having a certain proportion of solvents that bring about a partial solution or partial fusion of the particles on stoving, so that a size reduction can occur. Generally, particle sizes of preferably up to 10 μm and especially up to 5 μm are used; the lower limit is preferably about 1 μm. The particle size distribution of the powders used is variable over a wide range. Specific properties, such as e.g. the rheology, can optionally be deliberately influenced by variation of the particle size distribution.

The polyamide powders and/or polyacrylonitrile powders are added to the aqueous paste filler in amounts up to a maximum of about 20 wt. %, relative to the total composition. The lower limit is 0.1 wt. %, preferably 1 wt. %, relative to the overall composition of the paste filler. Preferably about 1 to 10 wt. % are used, although lower values also lead to an improvement of gravel-impact protection, especially when using polyamide powders.

The polyacrylonitrile powders suitable for use according to the invention can be homo- or copolymers; they contain at least 70 to 100 wt. % (preferably more than 90 wt. %) acrylonitrile and/or methacrylonitrile polymerized in. The remainder can be one or several comonomers. Examples are acrylic acid esters and methacrylic acid esters of $C_1$ to $C_{22}$-alcohols, vinylaromatic monomers with up to 20 C-atoms, e.g. styrene, vinyltoluene; esters of other unsaturated acids, such as maleic acid and fumaric acid esters of $C_1$ to $C_{22}$-alcohols, such as methyl methacrylate, butyl methacrylate, octyl methacrylate, ethyl acrylate, isobutyl acrylate; acrylic acid esters and methacrylic acid esters of perfluorinated $C_1$ to $C_{22}$-alcohols; vinyl monomers, such as vinyl chloride, vinyl ethers and vinyl esters; and mono- and diolefins, such as ethylene and butadiene.

In addition, unsaturated carboxylic, sulphonic or phosphonic acids and their esters for example can be used as monomers, such as crotonic acid, itaconic acid, vinylsulphonic acid, acrylamidopropylmethanesulphonic acid, vinylphosphonic acid and their esters. The suitable comonomers also include unsaturated primary, secondary and tertiary amines, such as e.g. dimethylaminoneopentyl methacrylate, dimethylaminoneopentyl acrylate, 2-N-morpholinoethyl methacrylate, 2-N-morpholinoethyl acrylate or also amides of acrylic and methacrylic acid, such as e.g. acrylamide, dimethylmethacrylamide and methylbutylacrylamide.

In addition, other functional monomers that are copolymerizable can also be used. They can contain hydroxyl, silane or epoxy groups, such as e.g. vinyltrimethoxysilane, vinyltributoxysilane, methacryloxypropyltrimethoxysilane, vinyltris(methoxyethoxy) silane, vinyltriacetoxysilane, N-methylolacrylamide as well as its alkyl ethers, N-methylolmethacrylamide and its alkyl ethers, hydroxyethyl methacrylate, hydroxybutyl acrylate, glycidyl acrylate, glycidyl methacrylate and hydroxyethyl acrylate.

The polyacrylonitrile powders are produced by conventional processes which are known to the expert. Suspension polymerization and emulsion polymerization are examples. They are described for example in "Chemische Technologie" by Winnacker-Küchler, Volume 6, Organische Technologie 2, Karl Hanser-Verlag Munich-Vienna 1982. Properties of the polyacrylonitrile powders, e.g. glass transition temperature and melting behaviour, can be influenced by selection of the appropriate monomers. The particle size distribution can be influenced by the chosen production process, or by the process parameters used in that connection, in the manner familiar to the expert.

The monomers, comonomers and conventional auxiliary agents are selected so that the requirements for the polyacrylonitrile powder, such as particle diameter, glass transition temperature, molecular weight and solution behaviour are achieved. The molecular weight ($M_w$) of the pulverulent polyacrylonitrile that is suitable according to the invention is at least 100,000. After production, the polyacrylonitrile powders can either be dispersed / further processed in aqueous suspension, e.g. with paste resin, or they are dried to powders and then, optionally after further grinding, used for the purpose according to the invention.

Polyamide powders that are used according to the invention can be produced from aminocarboxylic acids with for example 6 to 12 C-atoms per molecule or from their lactams, e.g. from ε-caprolactam, Ω-aminoundecanoic acid, lauryl lactam or their mixtures. Also suitable are the polycondensation products from diamines, e.g. hexamethylenediamine, and dicarboxylic acids, e.g. adipic acid, sebacic acid, dodecanedicarboxylic acid and terephthalic acid. Mixtures of diamines and dicarboxylic acids and mixtures of lactams, diamines and acids can also be used.

To obtain polyamides with increased content of functional groups, it is possible to use acids or amines with higher functionality, e.g. trimellitic acid or its anhydride as well as diethylenetriamine.

In producing the polyamide it is preferred that at least 70% of the convertible carboxyl groups are converted to amide groups. Further possibilities of conversion consist e.g. in the formation of ester groups. The polyamides can be altered in their properties, e.g. to obtain flexibilization, by means of polyether segments.

In this sense, polyester amides and copolyether amides also are included among the polyamides if at least 70% of the convertible carboxyl groups have been converted to amide groups.

The industrial production of the polyamides can be carried out by polycondensation of diamines or polyamines with dicarboxylic acids or polycarboxylic acids, by polycondensation of Ω-aminocarboxylic acids or by ring-opening polymerization of lactams. Production can be carried out in the melt or in solution. During or after the solution polymerization, the polyamide can optionally be present in fine-powdered form.

The number-average molecular weight of the usable polyamides is preferably above 500, preferably above 3000. The polyamides contain at least 10, preferably at least 15, amide groups per molecule Suitable polyamide powders are obtainable, e.g. under the trade names Orgasol (registered trademark) and Rilsan (registered trademark), from the ATO-Chemie company.

The polyacrylonitrile and polyamide powders used must not melt at temperatures up to 80° C. in the binder, grinding resin or solvent used, or be partially dissolved or swollen. They must thus exist unchanged under conditions of application and production. During the stoving they must not or at least not completely melt or be dissolved.

The surface of the powders can be free from ionic groups, but it can also contain ionic groups or acidic or basic groups in order e.g. to obtain improved dispersion stability or other desired properties.

The polyacrylonitrile and/or polyamide powders used according to the invention can be used together with conventional extenders and/or pigments. Such extenders can be used, for example, as are conventional in the production of paste fillers and also to a certain extent weight them. They can for example be inorganic pigments and extenders, e.g. carbon black, titanium dioxide, finely dispersed silicon dioxide, aluminium silicate (e.g. kaolin), magnesium silicate (e.g. talc), calcium carbonate (e.g. chalk), barium sulphate (e.g. barytes) and various pigments such as also metallic effect pigments. Organic and inorganic colouring pigments and corrosion protection pigments, such as lead and chromate compounds, can be used in addition.

If, in addition to the polyacrylonitrile and/or polyamide powders used according to the invention, other extenders, especially inorganic extenders and/or pigments, such as inorganic and organic pigments, are used, the proportion of polyamide and/or polyacrylonitrile powder is preferably 5 to 100 vol %, especially 5 to 60 vol %, of the sum of volumes of extenders, pigments and polyamide and polyacrylonitrile powders.

The polyamide and/or polyacrylonitrile powders, extenders and/or pigments used in the paste fillers according to the invention can be used in a form milled with synthetic resin as aqueous and/or solvent-containing pigment pastes. Such pigment pastes can be produced e.g. by optionally adding to pigment milling resins an amount of neutralizing agent necessary for neutralization and other auxiliary agents, such as e.g. wetting agents or solvents, converting with water (especially deionized water) to a low-viscosity aqueous dispersion, and then working-in the pigments with a high-speed mechanical agitator. It is also possible to use a component of the film-forming resin as a paste resin. According to a preferred mode of production, low-molecular, practically 100% melamine resin is dissolved as a paste resin, e.g. hexamethoxymethylmelamine in solvent, and after addition of optional wetting agents, water and the powders to be milled, is milled in a milling unit, e.g. a bead mill. The powders can be milled alone and in combination.

A further possibility of production for the milled pastes consists in the use of solvent-free or low-solvent dispersions for milling the powders.

The pastes obtained are diluted with water, either without further additions or after addition of the binders, optionally in dissolved form, in the form of aqueous dispersions and/or after addition of further additives.

According to another embodiment of the invention, the primer surfacer produced according to the invention is applied to a cataphoretic coating (cathodically deposited electrocoated coating), whose binder-crosslinker composition before stoving preferably contains at least 25 wt. % of amino-epoxy resin based on bisphenol A. In the case of external crosslinking it contains in addition at least 15 wt. % of blocked polyisocyanate. The wt. % values relate in each case to the binder-crosslinker solids content. The blocked polyisocyanate contains at least 8 wt. % of latent isocyanate groups. With self-crosslinking, the binder must contain at least 1.2% latent isocyanate groups. If one or several self-crosslinking binders and additional blocked isocyanates are present, the minimum content of latent isocyanate groups is 1.2%, calculated on the binder-crosslinker composition. The amino-epoxy resin must contain at least 65% bisphenol A segments (the molecular weight of a bisphenol A segment is 226). The compositions of the cataphoretic coating agents and their application are known from the literature and published patent applications. The cataphoretic coating agent compositions suitable according to the invention consist of hydroxyl-group-containing amino-epoxy resins that are produced from bisphenol A polyglycidyl ethers with at least one, preferably at least two, 1,2-epoxy groups per molecule. Polyglycidyl ethers containing 1,2-epoxy groups of the following general formula are preferred.

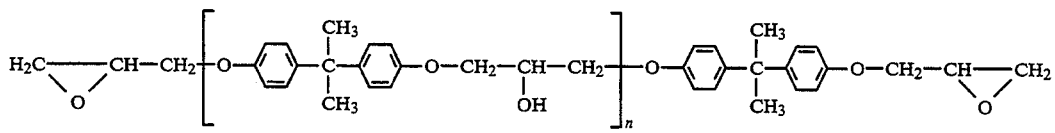

The amino groups are introduced into the polyglycidyl ethers containing 1,2-epoxy groups either by addition of NH-reactive compounds to the epoxy groups or by reaction of the hydroxyl groups with basic monoisocyanates that have been obtained by reaction of aromatic and/or aliphatic and/or cycloaliphatic di- or polyisocyanates with dialkylaminoalkanols (as described e.g. in the published German Patent Application 27 07 405).

As NH-reactive compounds, primary monoalkanolamines such as dialkylaminoalkylamine and/or secondary monoamines such as dialkylamines, monoalkylhydroxylamines or dihydroxyalkylamines and/or diketimines are used. Examples of usable compounds are diethylenetriamine-diketimine, diethylamine, dimethylaminopropylamine, N-methylaminoethanol and/or diethanolamine. If primary amines or secondary diamines are used, a chain lengthening occurs, e.g. on feeding the addition products of 1 mol of 1,6-hexanediamine and 2 mol of versatic acid glycidyl ester.

The number-average molecular weight (Mn) of the amino-epoxy resins is 400 to 10,000, preferably 1000 to 5000.

Further cataphoretic coating binders can be used in combination or in precondensation with the amino-epoxy resins based on bisphenol A, such as e.g. amino-epoxy resins based on bisphenol F and/or on novolak, amino-epoxy resins with terminal double bonds, aminopolyurethane resins, Mannich bases based on bisphenol A, reactive amine and formaldehyde, amine-group-containing polybutadiene resins, modified epoxidecarbon dioxide reaction products (as described e.g. in DE-A-36 44 370, EP-A-234 395) or Mannich bases modified with epoxy resins (as described e.g. in EP-A-209 857, EP-A-227 975). In addition, amino-group-containing acrylate resins (as described for example in DE-A-36 28 121) can be co-utilized, when, however, it must be taken into account that, depending on the nature and amount of the additive, some properties can deteriorate, such as e.g. intercoat adhesion or gravel-impact resistance.

The combination resins or precondensation resins, like the amino-epoxy resin based on bisphenol A, can have primary, secondary and/or tertiary amino groups or quaternary ammonium groups, but also sulphonium and/or phosphonium groups. But they can also be free of basic groups. The amount of the binders without basic groups must naturally not be so large that they separate in aqueous dispersion. On the other hand, it is quite possible, when the emulsifying power of the partially neutralized binder with basic groups is sufficiently large, that up to 60 to 70% of the added binders, plasticizers, crosslinkers etc. without basic groups remain stably dispersed. Usually their amount is less than 30%.

Blocked diisocyanates and/or polyisocyanates are used as isocyanate crosslinkers. The following are named as examples of isocyanates that can be used in blocked form and optionally in the form of blocked prepolymers: ethylene, propylene, tetramethylene, hexamethylene, decamethylene and dodecamethylene diisocyanates; 2,4,4-trimethylhexamethylene-1,6-diisocyanate; phenylene, tolylene and naphthalene diisocyanates; 4,4-methylenebis(phenylisocyanate), 4,4'-ethylenebis(phenylisocyanate), $\Omega,\Omega'$-diisocyanato-1,3-dimethylbenzene (m-xylylene diisocyanate), $\Omega,\Omega'$-diisocyanato-1,4-dimethylbenzene, $\Omega,\Omega'$-diisocyanato-1,3-dimethylcyclohexane, 1-methyl-2,4-diisocyanatocyclohexane, 4,4'-methylene-bis(cyclohexylisocyanate), 4,4'-ethylenebis(cyclohexylisocyanate), 3-isocyanatomethyl-3,5,5-trimethylcyclohexyl isocyanate, dimer acid diisocyanate, $\Omega,\Omega'$-diisocyanatodiethylbenzene, $\Omega,\Omega'$-diisocyanatodimethyltoluene, $\Omega,106'$-diisocyanatodiethyltoluene, fumaric acid-di(2-isocyanatoethyl) and triphenylmethane triisocyanate.

As prepolymers, reaction products from excess di- or polyisocyanate with low-molecular polyol can be used, such as e.g. with ethylene glycol, propylene glycol, 1,3-butylene glycol, neopentyl glycol, 2,2,4-trimethyl-1,3-pentanediol, hexamethylene glycol, cyclohexanedimethanol, hydrogenated bisphenol A, trimethylolpropane, trimethylolethane, 1,2,6-hexanetriol, glycerol, sorbitol, sucrose and pentaerythritol.

It can be advantageous to use isocyanate prepolymers that contain substituted urea groups.

Of the di- or polyisocyanates, those also can be used that have a biuret structure or an allophanate structure in blocked form.

Possible blocking agents are the known substances based on a phenol, lactam, compound containing active methylene groups, alcohol, mercaptan, hydroxyalkyl acrylate, hydroxyalkyl methacrylate, amide, imide, amine, tert-alkanolamine, imine, oxime or sulphite. Examples of blocking agents are: phenol, cresol, xylenol, nitrophenol, ethylphenol, tert-butylphenol, 2,5-di-tert-butyl-4-hydroxytoluene, ε-caprolactam, δ-valerolactam, γ-butyrolactam, β-propiolactam, acetylacetone, methanol, ethanol, propanol, butanol, amyl alcohol, lauryl alcohol, 2-methoxyethanol, 2-ethoxyethanol, 2-butoxyethanol, diethylene glycol monomethyl and monoethyl ethers, methoxypropanol, methoxymethanol, furfuryl alcohol, 2-ethylhexanol, hydroxyethyl acrylate, hydroxyethyl methacrylate, hydroxypropyl methacrylate, hydroxypropyl acrylate, diphenylamine, butylamine, dibutylamine, dimethylethanolamine, diethylethanolamine, imidazole, 2-ethylimidazole, urea, thiourea, ethyleneurea, 1,3-diphenylurea, the phenyl ester of N-phenylcarbamic acid, 2-oxazolidine, ethylene imine, formaldoxime, acetaldoxime, acetoxime, methyl ethyl ketoxime, methyl isobutyl ketoxime, diacetyl monooxime, benzophenone oxime, cyclohexanone oxime, potassium bisulphite, sodium bisulphite.

Blocked isocyanates in the sense of the invention react essentially under stoving conditions with reactive hydroxyl groups to urethane groups and with reactive amines to substituted urea groups. Not intended are the di- and polyisocyanates that react under the stoving conditions to a considerable degree as transesterification and transamidation crosslinkers, such as e.g. the isocyanates reacted with malonic ester or acetoacetic ester. These crosslinkers and also all other applicable crosslinkers can optionally be used in addition, such as e.g. further transesterification and transamidation crosslinkers, triazine-formaldehyde resins, urea-formaldehyde resins, phenol-formaldehyde resins, phenol allyl ether-formaldehyde resins, acetal-functional crosslinkers and urea condensation products (as described e.g. in DE-A-33 25 061). To produce self-crosslinking cataphoretic coating binders, the di- or polyisocyanates are partially blocked and the remaining free isocyanate groups are reacted with the reactive hydroxyl groups and/or the reactive amino groups.

The production of the cataphoretic coating baths and the topping-up materials is sufficiently well known. The binders with basic groups are partially neutralized with suitable acids and dispersed in water. The cataphoretic coating bath optionally contains pigments, extenders, plasticizers, additives, catalysts, organic solvents, organic powders or microparticles etc.

The coating of conductive surfaces can be carried out under known electrodeposition conditions. The primer surfacer is applied to a cataphoretic coating, wet-on-wet, or after drying the cataphoretic coating, optionally by heating, or after the stoving. The coat thickness of the electrodeposited coating can be maintained within conventional ranges, e.g. 10 to 50 μm. The primer surfacer is preferably applied in film thicknesses of 15 to 60 μm.

To the primer surfacer coat a conventional water-dilutable or solvent-dilutable unilacquer or effect lacquer, e.g. a metallic-effect lacquer or nacreous effect lacquer, can be applied wet-on-wet, after the flashing-off, optionally by heating, or after the stoving, and a conventional transparent water-dilutable or solvent-dilutable lacquer or a transparent powder coating can be applied, likewise wet-on-wet, after the flashing-off, optionally by heating, or after the stoving.

Through the paste fillers provided according to the invention and the process according to the invention, it becomes possible to make available gravel-impact-resistant primer surfacer or intermediate coats in multicoat lacquer finishes. Such primer surfacer or intermediate coats are particularly suitable in the motor vehicle sector. They can be used in new construction as well as in the repair of multicoat work. The paste fillers used have a very small content of organic solvents and provide both excellent gravel-impact resistance and outstanding corrosion protection. As a result of the low solvent content, emissions are greatly reduced.

The following examples serve to illustrate the invention. In the examples, the following raw materials are used:

Commercially available polyacrylonitrile powder containing about 7% of methyl acrylate, with a Tg (by DSC, differential scanning calorimetry) of more than 90° C., a molecular weight of >100,000 and a mean particle size $D_{50}=10$ μm (main particle size range: 1.5–16 μm).

Polyamide 612 powder:
Melting range: 135°–160° C. (measured by DSC, differential scanning calorimetry)
Number-average molecular weight: 3590, measured by vapour pressure osmosis, 120° C., DMF.

Mean particle size $D_{50}=11$ μm (main particle size range: 5–20 μm).

Commercially available alkyd resin, water-dilutable, fatty-acid-modified (Resydrol VWA 5477, manufacturer Hoechst AG, sold freely).

Solids content 35%
OH number: 197 mg KOH/1 g solids
Acid number: 43 mg KOH/1 g solids
Molecular weight (GPC, gel permeation chromatography), related to polystyrene in THF:
weight-average molecular weight $M_w=15,500$
number-average molecular weight $M_n=2300$
polydispersity: $D=M_w/M_n=6.7$ In the examples gravel-impact-resistant organic hydrofillers are prepared:

EXAMPLE 1

26.95 g hexamethoxymethylmelamine resin (HMMM) are charged and there are added to it successively with agitation 56.74 g dipropylene glycol monomethyl ether, 8.98 g of a commercially available polyfunctional wetting agent and 70.92 g deionized water.

Subsequently 47.28 g polyacrylonitrile powder, 18.91 g benzoin and 23.64 g polyamide 612 powder are strewn in while agitating. The mill charge is predispersed for 15 min with a rapid-agitating dissolver and then milled for 60 min in a bead mill. In the course of this, a temperature of 40° C. should not be exceeded.

To the cooled milled product, 718.20 g alkyd resin and 28.37 g deionized water are added slowly while agitating.

| Solids content: | 37.17% |
|---|---|
| Pigment volume concentration: | 19.2% |
| High-solid value: | 80.2% |

Gravel impact test:
Multi-impact, VDA [Automobile Industry Associatino] Test Sheet 621–427
(Method A, 1 bar/2*500 g) Characteristic value: 1.
Single-impact by DIN 55995:
Method A, instrument: model 490, Erichsen company
+20° C. <2 mm², slight debonding of finish
−20 ° C. <2 mm² slight debonding of finish

EXAMPLE 2

29.24 g hexamethoxymethylmelamine resin (HMMM) are charged and there are added to it successively with agitation 55.80 g dipropylene glycol monomethyl ether, 9.33 g of a commercially available polyfunctional wetting agent and 53.10 g deionized water.

Subsequently 74.84 g polyacrylonitrile powder are strewn in while agitating. The mill charge is predispersed for 15 min with a rapid-agitating dissolver and then milled for 60 min in a bead mill. In the course of this, a temperature of 40° C. should not be exceeded.

To the cooled milled product, 750.65 g alkyd resin and 27.03 g deionized water are added slowly while agitating.

| Solids content: | 37.0% |
|---|---|
| Pigment volume concentration: | 19.45% |
| High-solid value: | 80.0% |

Gravel impact test:
Multi-impact, VDA [Automobile Industry Association] Test Sheet 621–427
(Method A, 1 bar/2,500 g) Characteristic value: 1.
Single-impact by DIN 55995:
Method A, instrument: model 490, Erichsen company
+20° C. <2 mm² debonding of finish
−20° C. <2 mm² debonding of finish

EXAMPLE 3

26.11 g hexamethoxymethylmelamine resin (HMMM) are charged and there are added to it successively with agitation 50.39 g dipropylene glycol monomethyl ether, 8.70 g of a commercially available polyfunctional wetting agent and 122.77 g deionized water.

Subsequently 68.71 g polyamide 612 powder are strewn in while agitating. The mill charge is predispersed for 15 min with a rapid-agitating dissolver and then milled for 60 min in a bead mill. In the course of this, a temperature of 40° C. should not be exceeded.

To the cooled milled product, 695.83 g alkyd resin and 27.49 g deionized water are added slowly while agitating.

| Solids content: | 34.2% |
|---|---|
| Pigment volume concentration: | 21.42% |
| High-solid value: | 80.2% |

Gravel impact test:
Multi-impact, VDA [Automobile Industry Association] Test Sheet 621–427
(Method A, 1 bar/2*500 g) Characteristic value: 1.
Single-impact by DIN 55995:
Method A, instrument: model 490, Erichsen company
+20° C. <2 mm²
−20° C. <2 mm², debonding of primer surfacer/cataphoretic coating

EXAMPLE 4

24.56 g hexamethoxymethylmelamine resin (HMMM) are charged and there are added to it successively with agitation 28.12 g dipropylene glycol monomethyl ether, 9.81 g of a commercially available polyfunctional wetting agent and 40.17 g deionized water.

Subsequently 11.25 g polyamide 612 powder, 63.81 g barium sulphate, 135.86 g titanium dioxide and 31.93 g talc are strewn in while agitating. The mill charge is predispersed for 15 min with a rapid-agitating dissolver and then milled for 60 min in a bead mill. In the course of this, a temperature of 40° C. should not be exceeded. To the cooled milled product, 654.50 g alkyd resin are added slowly while agitating.

| Solids content: | 50.1% |
|---|---|
| Pigment volume concentration: | 23.0% |
| High-solid value: | 89.2% |

Gravel impact test:
Multi-impact, VDA [Automobile Industry Association] Test Sheet 621–427
(Method A, 1 bar/2*500 g) Characteristic value: 1.
Single-impact by DIN 55995:
Method A, instrument: model 490, Erichsen company
+20° C. <2 mm² debonding of finish
1−20° C. <2 mm² debonding of finish
We claim:

1. A process for producing a gravel-impact-resistant multicoat lacquer finish on electrically conductive substrates comprising:

applying a primer on a conductive substrate by cathodic electrodeposition from an aqueous coating agent;

subsequently applying over the applied primer, either wet-on-wet, or after flashing-off or after stoving, a primer surfacer coat of an aqueous paste filler containing at least one curable water-dilutable binder cured at a temperature not greater than 180° C.; and applying over the applied primer surfacer coat, either wet-on-wet or after flashing-off or after stoving, at least one base coat and at least one finishing coat, wherein the aqueous paste filler comprises 0.1 to 20 wt % of at least one member selected from the group consisting of polyamide powder and polyacrylonitrile powder which do not melt or dissolve during stoving and which have particle diameters in a range of 0.1 to 100 μm, and wherein the aqueous paste filler has a high-solid value of not less than 75 wt. %.

2. A process according to claim 1, wherein the aqueous paste filler further comprises at least one member selected from the group consisting of pigments and inorganic extenders.

3. A process according to claim 2, wherein in the aqueous paste filler the at least one member selected from the group consisting of polyamide powder and polyacrylonitrile powder amounts to 5 to 100 vol % of the total volume of inorganic extenders, pigments, polyamide powder and polyacrylonitrile powder.

4. A process according to claim 2, wherein at said temperature not greater than 80° C. the at least one member selected from the group consisting of polyamide powder and polyacylonitrile powder in the aqueous paste filler is not melted or dissolved.

5. A process according to claim 1, wherein the aqueous paste filler further comprises a water-dilutable binder based on hydroxyl-group-containing polycarboxy compounds and at least one polyvalent film-forming synthetic resin that reacts with hydroxyl groups.

6. A process according to claim 5, wherein the binder contains 60 to 90 wt. % of a mixture or partial condensation product of a water-insoluble film-forming polyhydroxy compound with an acid number of less than 10 mg KOH/g and a hydroxyl number of 50–650 mg KOH/g and a film-forming polycarboxy compound with an acid number of 30–280 mg KOH/g in a molar ratio of carboxyl groups to hyroxyl groups of 1:2 to 1:25, with at least partially neutralized carboxyl groups and 10–40 wt. % of a polyvalent film-forming synthetic resin without polyelectrolyte character that reacts with hydroxyl groups, the percentages by weight relating in each case to a solid content of the binder.

7. A process according to claim 6, wherein the binder has a polydispersity $(D = M_w M_n)$ of <3.5.

8. A process according to claim 6 wherein the binder is diluted with water to a resin solid content of 35–60 wt. %.

9. A process according to claim 6, wherein the film-forming polycarboxy compound comprises products of addition of maleic anhydride to unsaturated fatty acid esters.

10. A process according to claim 6, wherein the water-insoluble film-forming polyhydroxy compound comprises esters of dicarboxylic acids with polyols.

11. A process according to claim 6, wherein the polyvalent film-forming synthetic resin without polyelectrolyte character comprises a melamine resin.

12. A process according to claim 1 wherein the at least one powder has been milled with a paste resin.

13. A process according to claim 1 further comprising lacquering motor vehicle parts using said lacquer finish.

14. A process according to claim 1, comprising depositing the primer by cathodic electrodeposition from an aqueous coating agent consisting of a crosslinking amino-group-containing epoxy resin based on bisphenol A containing at least 65 mol % of units based on bisphenol A.

15. A process according to claim 14, comprising self-crosslinking using an amino-group-containing epoxy resin that contains 1.2 mol % of blocked isocyanate groups.

16. A process according to claim 15, comprising external crosslinking using additionally 15% of blocked polyisocyanate that contains at least 8 mol % of blocked isocyanate groups.

17. A process according to claim 11, wherein the melamine resin is hexamethoxymethylmelamine.

18. A process according to claim 12, wherein the paste resin is a melamine resin.

* * * * *

UNITED STATES PATENT AND TRADEMARK OFFICE
CERTIFICATE OF CORRECTION

PATENT NO. : 5,385,656
DATED : January 31, 1995
INVENTOR(S) : Doebler, et al.

It is certified that error appears in the above-identified patent and that said Letters Patent is hereby corrected as shown below:

Column 9, line 25, "106" should be --Ω--.

Column 12, line 3, "2,500" should be --2*500--.

Column 12, line 67, delete "1".

Claim 7, line 11, "<3.5" should be -->3.5--.

Signed and Sealed this

Twelfth Day of September, 1995

BRUCE LEHMAN

Attest:

Attesting Officer

Commissioner of Patents and Trademarks